Aug. 5, 1930.  F. SMITH  1,772,326
GATE FASTENER
Filed Aug. 14, 1929
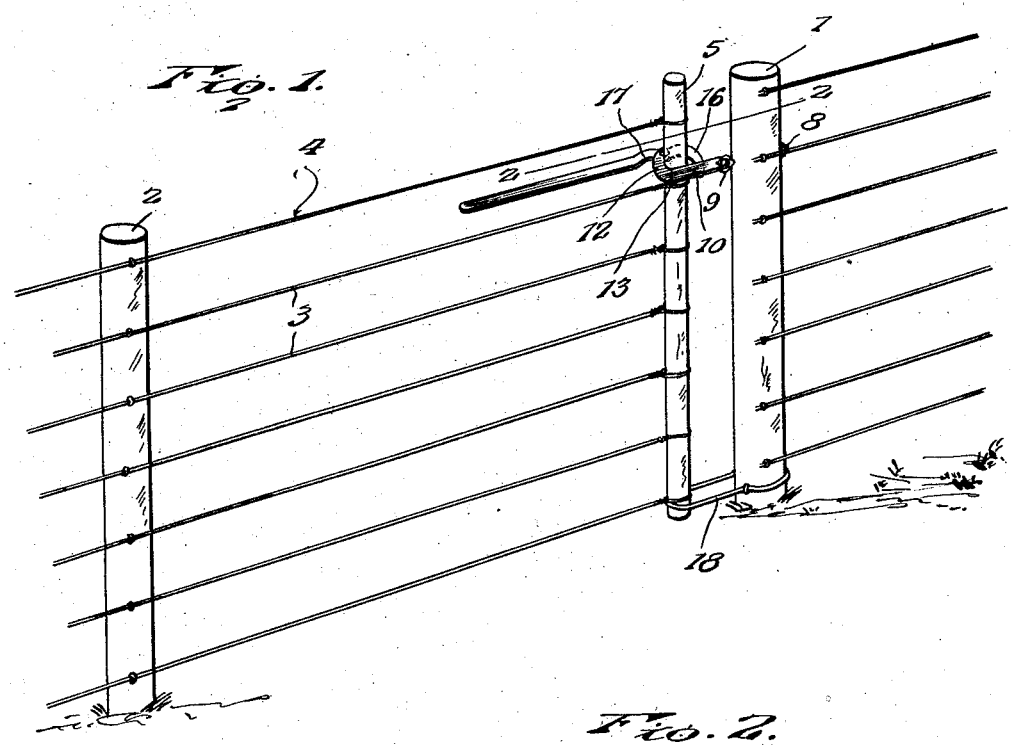
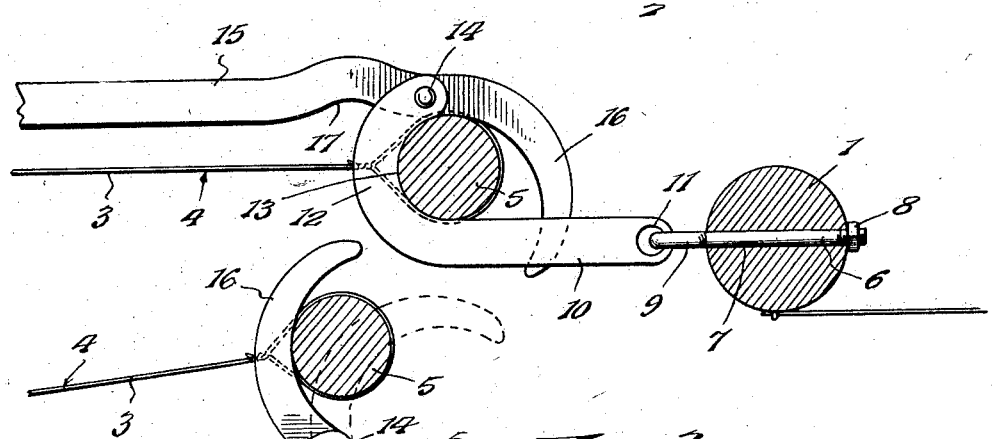
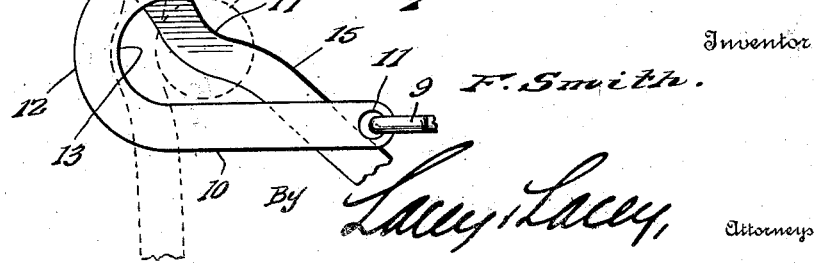
Inventor
F. Smith.
By Lacey & Lacey,
Attorneys Patented Aug. 5, 1930

1,772,326

UNITED STATES PATENT OFFICE

FRANCIS SMITH, OF SILT, COLORADO

GATE FASTENER

Application filed August 14, 1929. Serial No. 385,825.

The present invention is directed to improvements in gate fasteners.

The primary object of the invention is to provide a device of this character which will effectively hold a frameless gate in closed position, the construction being such that the gate can be readily released when desired.

Another object of the invention is to provide a device of this character so constructed that when the gate is in its closed position the wire strands forming the same will be held firmly stretched.

Another object of the invention is to provide a device of this character so constructed that the fastener can be easily and quickly manipulated to open or close the gate, the construction being extremely simple, durable, and one which can be manufactured at a very small cost.

With these and other objects in view, this invention resides in the novel features of construction, formation, and combination of parts to be hereinafter more fully described, claimed and illustrated in the accompanying drawing, in which:

Figure 1 is a perspective view of the fastener showing the same in position when the gate is closed.

Figure 2 is a sectional view on the line 2—2 of Figure 1.

Figure 3 is a sectional view showing the fastener in the position assumed for operation in closing the gate.

Referring to the drawing, 1 designates a fence post which may be formed from tubular metal or wood, as desired, said post being spaced from a similar post 2, and it is to the post 2 that the line wires 3 of the fence are secured, said line wires providing the frameless gate 4. The strands forming the gate 4 are secured to a tubular bar 5.

The fastener comprises a bolt 6 which is engaged in a transverse opening 7 formed in the post 1, said bolt having a nut 8 upon its outer end while its inner end is provided with an eye 9, said bolt being adjustable when desired upon manipulating the nut.

A link pin is provided and has its outer end formed with an eye 11 for pivotally engaging the eye 9 of the bolt 6, said link having its inner end provided with an angularly disposed curved shank 12 forming a seat 13. Pivotally connected to the terminal of the shank 12, as at 14, is a lever 15, the forward end of which is provided with a hook 16. The lever is provided intermediate its ends with a recess 17, the purpose of which will be later explained.

The post 1 has engaged near its lower end, a loop 18 in which the lower end of the bar 5 is engaged when the gate is being fastened and holds the lower end of said bar properly after the gate is fastened.

Briefly, the operation is as follows:

The lower end of the bar 5 is placed in the loop 18 and the hook 16 is engaged with the bar and initially assumes the position shown in Figure 3, whereupon the lever 15 is swung forwardly to swing the bar 5 toward the link 10 so that said bar will slip into the seat 13 of the shank. The strands 3 forming the gate will then be under sufficient tension to retain the bar in said seat. To unfasten the gate, the link 15 is swung forwardly unless the recess 17 engages the bar 5, whereupon continued forward movement of the lever will stretch the strands 3 sufficiently to permit the bar 5 to disengage the seat 13, after which the bar is lifted from the loop 18.

From the foregoing, it is thought that the operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What is claimed is:

1. The combination with a fixed gate post, of a gate including an end bar, a link pivotally connected with the post, a seat associated with the link, a lever pivotally connected with the link and having a hook upon one end, said hook being adapted to engage the bar to move the same into the seat when the lever is swung in one direction.

2. The combination with a fixed gate post, of a frameless gate including an end bar, a link pivotally connected with the post, said link having a shank carried thereby, a seat formed in the shank, a lever pivotally connected with the shank and having a hook upon one end adapted to engage the bar to move the same into the seat when the lever is swung in one direction.

3. The combination with a fixed gate post, of a frameless gate including a bar, a bolt carried by the post, a link pivotally connected to the bolt, said link having an angularly disposed shank provided with a seat, a lever pivotally connected with the shank, a hook carried by the lever for engaging the bar to move the same into seat upon swinging the lever in one direction, and a loop carried by the post for receiving the lower end of the bar.

4. The combination with a fixed fence post, of a gate including an end bar, a link pivotally connected with the post, said link having a seat associated therewith, a lever pivotally connected with the link, said lever having a hook upon one end for engaging the bar to swing the same into the seat when the lever is swung in one direction, said lever having a recess therein for engaging the bar to cause disengagement of the bar from the seat when the lever is swung in a reverse direction.

In testimony whereof I affix my signature.

FRANCIS SMITH. [L. S.]